United States Patent [19]
Burch

[11] 3,873,902
[45] Mar. 25, 1975

[54] POSITIONING CONTROL SYSTEM FOR MATERIAL HANDLING VEHICLES

[75] Inventor: Arthur R. Burch, Plainwell, Mich.

[73] Assignee: Clark Equipment Company, Buchanan, Mich.

[22] Filed: June 15, 1970

[21] Appl. No.: 46,001

[52] U.S. Cl.................. 318/594, 187/29, 318/146, 318/158
[51] Int. Cl. .......................................... G05b 11/18
[58] Field of Search ............ 187/29; 318/594, , 146, 318/158

[56] References Cited
UNITED STATES PATENTS

| | | | |
|---|---|---|---|
| 3,407,905 | 10/1968 | Gingrich | 187/29 |
| 3,507,360 | 4/1970 | Ostrander et al. | 187/29 |

*Primary Examiner*—T. E. Lynch
*Attorney, Agent, or Firm*—Harry G. Thibault

[57] ABSTRACT

A control system is disclosed for automatically positioning a material handling vehicle at an assigned station with a high degree of positional accuracy. The automatic control system is adapted for an automatic warehouse in which a stacker vehicle is movable in one or more aisles between arrays of storage bins. The automatic control means utilizes address signal devices at each station and a transducer on the vehicle coacting therewith to produce control signals for regulating the movement of the vehicle. The vehicle is moved from one station to another at relatively high speeds which may be reduced as the destination station is approached. When the vehicle arrives at the station, control of the drive motor is transferred to a fine positioning system adapted to drive the vehicle at very low speeds to a reference or null position. In the fine positioning mode of operation a signal device at the station defines first and second limit positions and the transducer includes sensing means with first and second spaced sensors. When both limit positions are detected by the sensors simultaneously the null position is thereby signified and the vehicle is stopped. Additionally, control means are provided to reverse the energization of the drive motor in case the vehicle overshoots the null position. Preferably, the null sensors take the form of proximity detectors using magnets and reed switches and the null signal device takes the form of at least one vane of magnetic material with the ends thereof defining the limit positions.

12 Claims, 8 Drawing Figures

INVENTOR.
Arthur R. Burch
BY
Barnard, McGlynn & Reising
ATTORNEYS

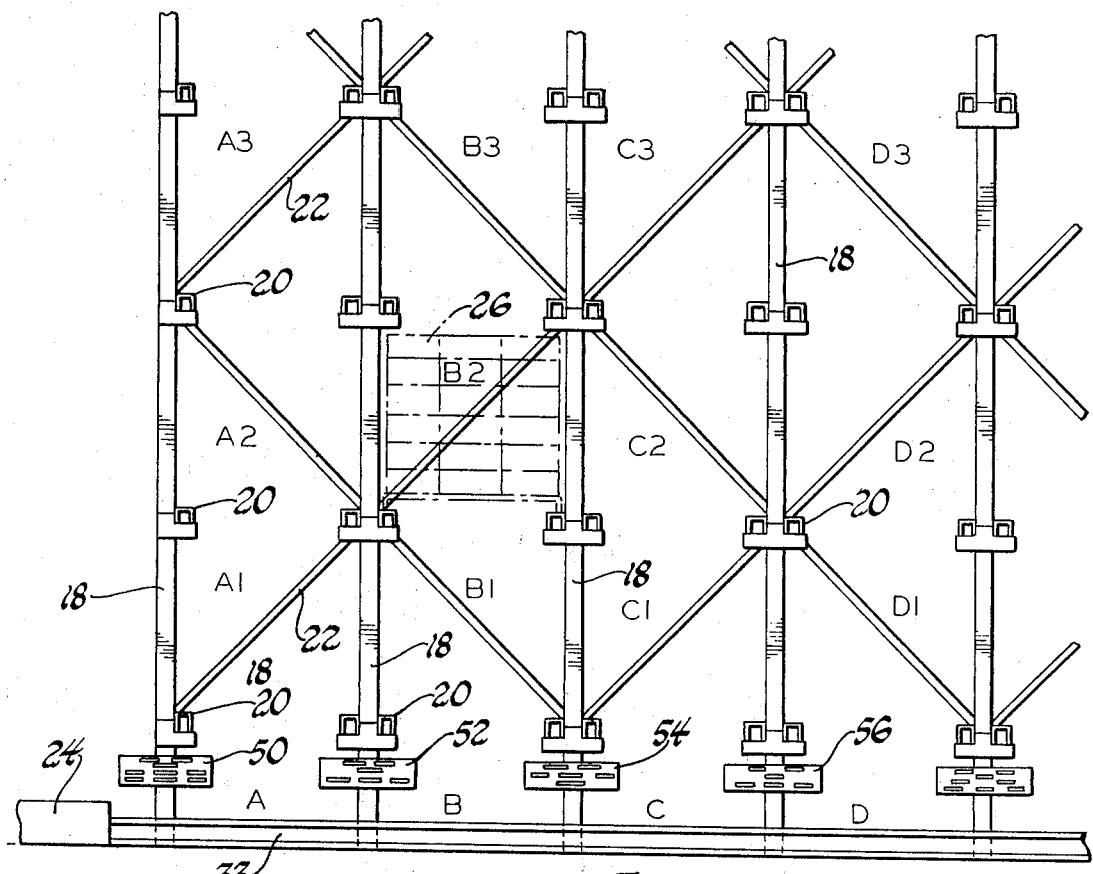
Fig. 3
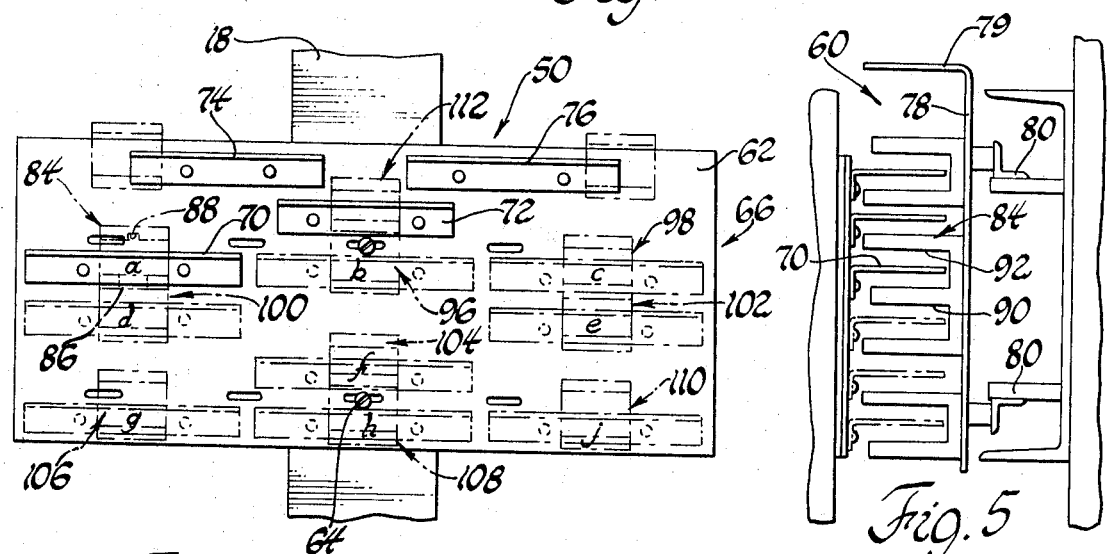
Fig. 4
Fig. 5

POSITIONING CONTROL SYSTEM FOR MATERIAL HANDLING VEHICLES

This invention relates to control systems for material handling vehicles and, more particularly, it relates to an automatic positioning system for such vehicles.

Automatic warehouse or storage systems have been developed in which a very large number of storage bins are arranged in rows and columns on each side of multiple access aisles and are served by automatically controlled material handling vehicles. Such a vehicle, commonly called a stacker vehicle, is adapted to pick up a material unit at a load station and to move under automatic control to a destination station and deposit the material unit in the storage bin at such station. Similarly, the stacker vehicle may automatically pick up a material unit from a storage bin at any station and move automatically to the load station or to another storage bin and deposit the material unit. Such a system has been developed in which the automatic control means for the vehicle reads the addresses of the stations while the vehicle is enroute for controlling the motive power means in the vehicle. Such a system is disclosed and claimed in U.S. Pat. No. 3,503,530 issued to A. R. Burch, et al., on Mar. 31, 1970 for "Transfer Cart for Transferring an Article Handling Vehicle Between Aisles of a Warehouse."

In such systems it is desired to operate the stacker vehicle at high speed in its movements between stations. Accordingly, it is known to regulate the speed of the stacker vehicle in accordance with the distance from its current location to the destination station. In one such system the speed is reduced in a stepwise fashion as the destination station is approached and when the vehicle arrives at the station the control thereof is transferred to a so-called fine positioning system adapted to drive the vehicle at low speeds to obtain accurate positioning thereof at the station. Accurate positioning of the vehicle is necessary so that the material handling dolly on the vehicle will be properly aligned with the adjacent bins to permit deposit and withdrawal of material units. The fine positioning control system for a stacker vehicle may utilize a fixed magnetic strip at the station and a Hall effect transducer on the vehicle as described in the above-identified U.S. Pat. No. 3,503,530. Another type of fine positioning system utilizes a small permanent magnet at the station and a magnetic reed switch mounted upon the vehicle for controlling the energization of the stacker vehicle drive motor. Such a control system is disclosed in copending U.S. patent applications Ser. No. 880,582, filed Nov. 28, 1969 by James H. Snyder for "Means for Controlling Automatically Moved Vehicle."

This invention resides in an improved control system for moving a vehicle into a predetermined position relative to a selected station. The improved system is capable of moving the vehicle into final position in a relatively short time with a high degree of positional accuracy. This is accomplished by control means including a signal device at the selected station and defining first and second limit positions and also including sensing means with first and second spaced sensors on the vehicle adapted to produce a first signal when aligned with either the first or second limit position and power control means connected with the sensing means and responsive to the occurrence of a signal from one of the sensors to cause energization of the motive power means of the vehicle for movement thereof toward the predetermined position and stopping control means connected with the sensing means responsive to the simultaneous occurrence of signals from both the sensors to interrupt the power to the motive power means and stop the vehicle.

Additionally, in accordance with this invention, the control system for positioning the vehicle at the selected station enables high-speed operation of the vehicle between the initial station and the destination station with a minimum of time required for final positioning. This is accomplished by providing first control means responsive to the destination station command signal to cause energization of the motive power means to move the vehicle toward the selected station at a controlled speed, for example, a speed which varies in a stepwise fashion inversely with the distance to the destination station. Transition control means responsive to the arrival of the vehicle at the selected station transfers control of the motive power means to the fine positioning control system. The power control means connected with the sensing means responds to the occurrence of a signal from one of the sensors to cause energization of the motive power means for continued movement in the same direction suitably at a reduced speed.

Further, in accordance with the invention the fine positioning control system is simple and fast acting, in keeping with the nature of the vehicle, so that the fine positioning is achieved without undue delay and manipulation. This is accomplished by use of a motive power means including a servo amplifier adapted to be operated in an on-off mode and responsive to a binary input signal with the sensors being adapted to develop a binary control signal for the servo amplifier.

Further, according to the invention, the control system is operable in an on-off manner and capable of correcting any overshoot of the desired position. This is accomplished by providing a reversing control means which is adapted to reverse the energization of the motive power means in response to a second occurrence of one of the binary signals from the sensor which caused energization of the motive power means in the first instance.

Additionally, in accordance with the invention, the signal device at the station comprises at least one magnetic plate which defines the first and second limit positions and the sensing means comprises a magnetic field producing means and magnetic field responsive switch means adapted to receive said magnetic plate in an air gap therebetween to produce said binary signals in accordance with the presence or absence of the magnetic plate.

A more complete understanding of this invention may be obtained from the detailed description which follows taken with the accompanying drawings in which:

FIG. 3 is a side elevation of the storage structure including a view of the station address means;

FIG. 4 shows the station address means in a plan view with the relationship of the transducer sensors thereto shown in phantom lines;

FIG. 5 shows the station address means and the transducer means in coacting relationship;

Figure 1:
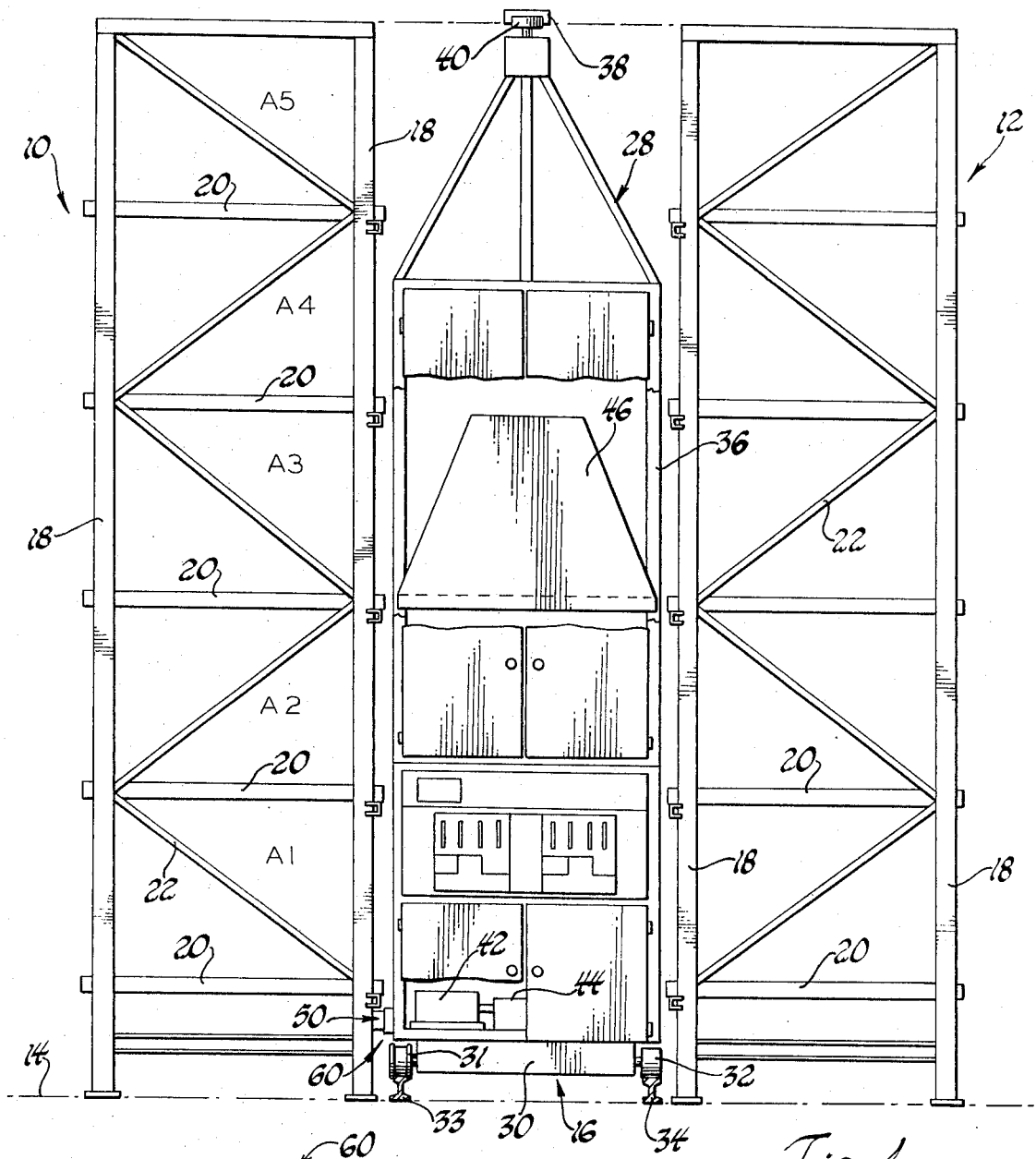
FIG. 1 is an end elevation of a storage structure and a stacking vehicle therefor.

Referring now to the drawings, there is shown an illustrative embodiment of the invention in an automatic warehouse system wherein a self-propelled stacker vehicle is adapted to transport material units between any selected storage bin and a load station or between two storage bins. Control means for the vehicle include address means at the stations and a transducer on the vehicle adapted to coact therewith so that the addresses of the stations may be read while the vehicle is enroute or at a standstill in a given station. The control system in which the invention is embodied is adapted to control the vehicle in its movement from its initial station to the destination station by energization of the motive power means of the vehicle at selectively controlled speeds until the vehicle arrives at the destination station. Upon arrival at the destination station the fine positioning control means assumes control of the vehicle and causes energization of the motive power means to move the vehicle into a predetermined position relative to the destination station so that the material handling dolly on the vehicle is properly aligned with the adjacent bins for deposit or withdrawal of a material unit.

The Automatic Warehouse Arrangement

Referring now to FIG. 1, a warehouse adapted for automatic deposit and retrieval of material units includes a storage structure with bin assemblies 10 and 12 mounted on the warehouse floor 14 with an access aisle 16 therebetween. The bin assemblies 10 and 12 may be of identical construction and a multiplicity of such bin assemblies may be used in a given warehouse depending upon the capacity required. The bin assembly 10 is shown in side elevation in FIG. 3 and comprises vertical columns 18, which may extend from floor to ceiling in the warehouse, and a set of vertically spaced transverse beams 20 together with suitable sway braces 22. The columns 18 and the beams 20 define a multiplicity of storage bins which are disposed in a rectangular array of columns and rows of bins. A column of bins is located at station A wherein a bin is provided at five different vertical levels corresponding to the transverse beams 20 which together with the columns 18 define bins A1, A2, A3, A4 and A5. Similarly, a column of bins is provided at stations B, C, D, etc., with individual bins at the different vertical levels and thus providing rows of bins A1, B1, C1, D1, etc., and a row of bins A2, B2, C2, D2, etc. Similarly, the bin assembly 12 comprises a multiplicity of bin columns at the respective stations A, B, C, D and E, etc., and a plurality of bin rows at the vertical levels of A1, A2, A3, A4 and A5. The bins in the two bin assemblies 10 and 12 are distinguished from each other by the convention of identifying the bins by station number, vertical level and by designation of left or right side of the aisle, when looking down the aisle from a load station 24, which is considered to be the head of the aisle. For example, a material unit 26 is shown in FIG. 3 in bin B2, i.e., station B, second level on the left side. Because of the very large number of stations which may be employed in a single warehouse, it is desirable to utilize an address number to identify the different stations. In order to provide for automatic readout of the address, it is convenient to encode the address number in binary form and to identify the station for manual reading in binary coded octal form.

In order to deposit and withdraw material units from any selected bin in the bin assemblies 10 and 12, a material handling or stacking vehicle 28 is provided for movement up and down in the aisle 16 to any station. The stacker vehicle comprises an undercarriage 30 with a set of wheels 31 and 32 which are supported respectively upon rails 33 and 34 for motion along the aisle. The wheels 31 on one side of the vehicle are provided with a double flange to maintain alignment with the track 33 which in turn is accurately aligned with and spaced relative to the bin assemblies 10 and 12. With this arrangement the wheels 32 need not be provided with a flange and the track 34 need not be accurately aligned and positioned relative to the bin assemblies. The stacker vehicle includes a superstructure or mast 36 on the undercarriage 30 which extends to an upper track 38 mounted overhead in the aisle 16 which receives an idler wheel 40 for stabilizing the mast of the vehicle. The stacker vehicle is self-propelled and includes a traction motor 42 which is coupled through a power transmission 44 to the traction wheels. The traction motor 42 is an electric motor and is suitably supplied with electric power through a trolley system, not shown. Additionally, the stacker vehicle comprises an elevator 46 which is movable vertically in the mast 36 and may be positioned at any bin of the bin assemblies.

Station Address Means

Figure 2:
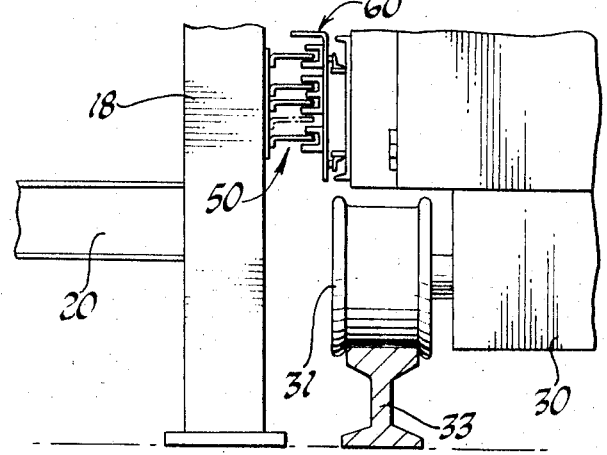
FIG. 2 shows the structure of a station address means together with the transducer mounted on the vehicle.

In order to identify a large number of stations in the warehouse, it is desirable to assign an address number to each station and to encode the addresses in binary form to permit automatic reading of the addresses. For this purpose an address means is provided at each station of the bin assembly. The address means comprises address signal devices 50, 52, 54 and 56, etc., at the stations A, B, C, D, etc., as shown in FIG. 3. The signal devices utilize an array of binary storage elements of the noncontacting type and which are especially adapted for the rugged environment of an automatic warehouse or storage system. Thus, the signal device is adapted to coact with a sensing means or transducer 60 which, as shown in FIG. 2, is mounted upon the side of the stacker vehicle for the sensing or readout of the signal devices 50, 52, 54, etc. The transducer 60 is a proximity detector which, as described subsequently, includes magnetic field producing means and magnetic field sensing means or responds to the presence and absence of a magnetic field, and the signal device is adapted to alter the magnetic field in accordance with its encoded address number. As shown in FIGS. 2 and 3, the signal devices 50, 52, 54, etc., are mounted on the columns 18 of the respective bins or stations at a level just below the transverse beams 20 of the lowermost bins. The transducer 60 is mounted on the left side of the stacker vehicle at a position which is in alignment with the signal devices and which is adjacent thereto in a given station. The positioning and spacing of the signal devices and the transducer is such that the stacker vehicle may move through the stations with the signal device and transducer disposed close enough to permit the desired coaction but without any interference or physical engagement therebetween.

The construction of the signal devices 50, 52, 54, etc., is represented by signal device 50 which is shown in detail in FIGS. 4 and 5. The signal device 50 comprises a support plate 62 suitably of metallic construction which is adapted for mounting on the columns 18 adjacent the respective stations. The support plate 62 is suitably mounted by screw threaded fasteners 64 which extend through slots in the plate to engage the column 18 and provide for adjustable positioning of the signal device in the direction of the aisle 16. The support plate includes a matrix area 66 which is adapted to accept an array of binary code elements at predetermined positions within the matrix. In the illustrative example there are nine such positions labeled $a$ through $h$ and $j$ within the matrix. The positions $a$ through $h$ represent information bits and the position $j$ represents a parity bit. The positional significance of the bits is assigned in ascending order from $a$ to $h$ so that position $a$ represents the least significant digit and position $h$ represents the most significant digit. Thus, a matrix with eight bit positions having position coefficients ranging from one to 128 and a maximum number of 255 station addresses within a given aisle is adapted to accommodate a large number of storage bins in each aisle. The two binary conditions (1 and 0) of each bit position in the address signal device is represented by the presence or absence of a code element at the bit position. Such a code element takes the form of a plate or vane 70 which is constructed of magnetic material having a high permeability relative to that of air, such as sheet steel. The vane 70 shown in bit position $a$ in FIG. 4 comprises a sheet metal plate of sufficiently heavy gage to insure rigidity and having a mounting flange suitably riveted to the support plate 62 so that the vane extends in a direction normal to the support plate and in a horizontal plane. As illustrated in FIG. 4 the address of station A, represented by signal device 50, is encoded by the presence of a single code element or vane 70 which is located in the bit position $a$. The remainder of the bit positions are illustrated by the indication of vanes in phantom lines thus showing all possible positions for vanes in the matrix area 66 for use in designating a station address. Thus, for a station designator with a single vane in the bit position $a$, the address would be read in decimal form as station No.1. It will be appreciated that by providing the other address signal devices 52, 54, 56, etc., with vanes positioned selectively in the bit positions, the desired station number may be designated. For example, with a vane in positions $a, b, d, e$ and $g$, the address in decimal form is station No. 91 and in octal form is station No. 133. The parity bit position $j$ is provided with the address bit positioned for use in checking the accuracy of the readout in a conventional manner. The parity bit position is provided with a vane in each address wherein the number of bit positions occupied by a vane is an even integar so that the station designator matrix area 66 is always occupied by an odd number of vanes.

In addition to the station designator matrix area 66, each of the signal devices includes a strobe element in the form of a vane 72 which is located at a longitudinally central position on the support plate 62. The strobe vane 72, as will be described hereinafter, is adapted to coact with the transducer so as to enable parallel readout of the station address, i.e., to initiate the sensing by the transducer of the presence or absence of a vane in all of the positions $a$ through $h$ and $j$ simultaneously.

Additionally, the address signal device is provided with a null position signal device which suitably takes the form of a pair of null position plate elements or vanes 74 and 76. The vanes 74 and 76 are of the same structure as the other vanes but are positioned at the uppermost level on the support plate 62 and are symmetrically disposed with respect to the vertical centerline thereof. The null position signal device may also take the form of a single plate or vane as will be apparent hereinafter. The null position vanes are adapted to coact with sensors on the transducer and produce a signal condition for the logic control system which is indicative of positioning of the stacker vehicle at a prescribed location at a given station. The null position signal device and the operation thereof in the fine positioning control means will be described in greater detail subsequently.

Vehicle Transducer Means

Figure 6:
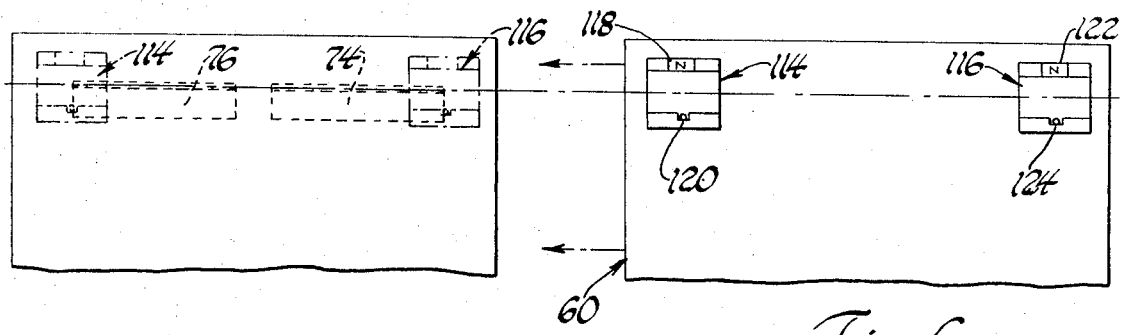
FIG. 6 is a diagrammatic representation of the null sensors and null signal elements to aid the explanation of the operation.

The transducer 60, which is adapted to read out the signal devices at the various stations will be described with reference to FIGS. 4, 5 and 6. The transducer includes sensing means which are responsive to the presence or absence of a magnetic field and function in the manner of a proximity detector with respect to the address signal device. As shown in FIG. 5, the transducer 60 comprises a support plate 78 suitably of metallic construction which is formed with a laterally extending protective flange 79. The support plate 78 is mounted on the vehicle body by support brackets 80 and is adapted for limited positional adjustment in the vertical direction on the vehicle body so as to permit alignment thereof with the station address signal devices.

The transducer 60 further includes plural sensors located at predetermined positions in an array corresponding to the code element positions in the address signal device. Thus, as illustrated in FIGS. 4 and 5, the transducer is provided with sensors which are disposed in a mirror image array of the bit positions $a$ through $h$ and $j$ of the station designator matrix area 66. A sensor 84 at the position corresponding to position $a$ on the address signal device comprises a magnetic field producing means in the form of permanent magnet 86 of bar shape and a magnetic field responsive means in the form of a magnetic reed switch 88 which are disposed oppositely and spaced apart to accommodate a magnetic vane therebetween. The sensor 84 includes a nonmagnetic body, which in its entirety is of E configuration as shown in the side view of FIG. 5. The body portion is constructed of a nonmagnetic material such as aluminum or a molded resin and is adapted to support the permanent magnet 86 in the center leg 90 thereof. The magnetic reed switch 88 is supported in a slot on the inner side of the outer leg 92 while the body is secured to the support plate 78 by suitable fasteners extending through the base or bridging portion between the legs of the body. The magnetic reed switch 88 is a conventional type of single pole, two terminal switch wherein a reed type armature is adapted to open the contacts in the presence of a magnetic field of predetermined field strength and to close the contacts in the absence thereof. Thus, the sensor 84 includes all of the active elements required for detecting the presence of the code element in the form of a magnetic vane. As described, it may be regarded as being of U-shaped configuration with a permanent magnet in one leg 90 and a reed switch in the other leg 92. Thus, as indicated in FIG. 5, the vane 70 of the address signal device 50 extends into the space between the legs 90 and 92 and hence between the permanent magnet 86 and the reed switch 88 of the sensor. In the absence of the vane 70 between the legs of the sensor, the field of the permanent magnet is of sufficient intensity in the vicinity of the reed switch 88 to cause opening of the contacts thereof. When the vane 70 is inserted between the legs of the sensor 84 it is effective to distort the magnetic field by providing a short circuit path, i.e., a path of low magnetic reluctance for the magnetic flux from the permanent magnet 86 thereby reducing the flux field intensity in the vicinity of the reed switch below the predetermined value and the reed switch contacts are closed.

The transducer 60 also includes sensors of similar construction at the remaining predetermined positions on the support plate 78. As illustrated in FIG. 4, sensors 96, 98, 100, 102, 104, 106, 108 and 110 are located at the positions corresponding to the positions *b* through *h* and *j*, respectively, on the signal device 50. In order to sense the strobe vane 72 on the signal device a sensor 112 is positioned on the vertical center line of the transducer 70 for alignment with the strobe vane.

To provide for sensing of the null position of the transducer with reference to the address signal device for accurate positioning of the stacker vehicle at a station, a pair of sensors 114 and 116 are provided at the uppermost level of the transducer. As shown in FIG. 6, the sensor 114 comprises a permanent magnet 118 and a reed switch 120 which is closed when the null vane 76 of the null signal device extends therebetween. Similarly, the sensor 116 comprises a permanent magnet 122 and a reed switch 124 which is closed when the null vane 74 of the null sensing device extends between the magnet 122 and the reed switch 124. The relative positions of the null vanes 74 and 76 and the sensors 114 and 116 are adjusted so that both reed switches 120 and 124 are closed when the stacker vehicle reaches the desired or null position with reference to the bins at the station.

When the vehicle approaches a station so that the transducer 60 approaches alignment with the signal device 50, the strobe vane 72 will enter the air gap of the sensor 112 thereby causing the reed switch to close. When the strobe vane 72 is in such a position each of the address code vanes are similarly positioned with reference to their respective sensors and thus the transducer is enabled by the strobe vane to produce a parallel readout of the station address by simultaneous response of the sensors in the address readout portion of the transducer. It will be now be appreciated that the address signal devices 50, 52, 54, etc., at the various stations may be read out by the transducer 50 while the stacker vehicle is either stationary at the given station or while it is moving through the given station enroute from an initial station to a destination station. The readout is substantially instantaneous and occurs only when the vehicle is in a predetermined position with reference to the given station, i.e. when the strobe sensor is disposed adjacent the strobe vane which is dependent upon the length of the vane. Thus, the readout of the station addresses while the vehicle is in its initial position and while it is moving toward its destination may be used for control of the motive power means of the vehicle to achieve the desired acceleration and speed control so that the vehicle reaches its destination in an optimum time period.

Automatic Control System

In order to utilize the station address signal devices and the transducer therefor just described, a control system responsive thereto is provided for automatically controlling the motive power means of the stacker vehicle. Such a control system will be described with reference to FIG. 7 wherein it is illustrated in block diagram form. A control system of this type is disclosed and claimed in copending U.S. patent application Ser. No. 880,582 filed on Nov. 28, 1969 by James H. Snyder for "Means for Controlling Automatically Moved Vehicle."

Figure 7:
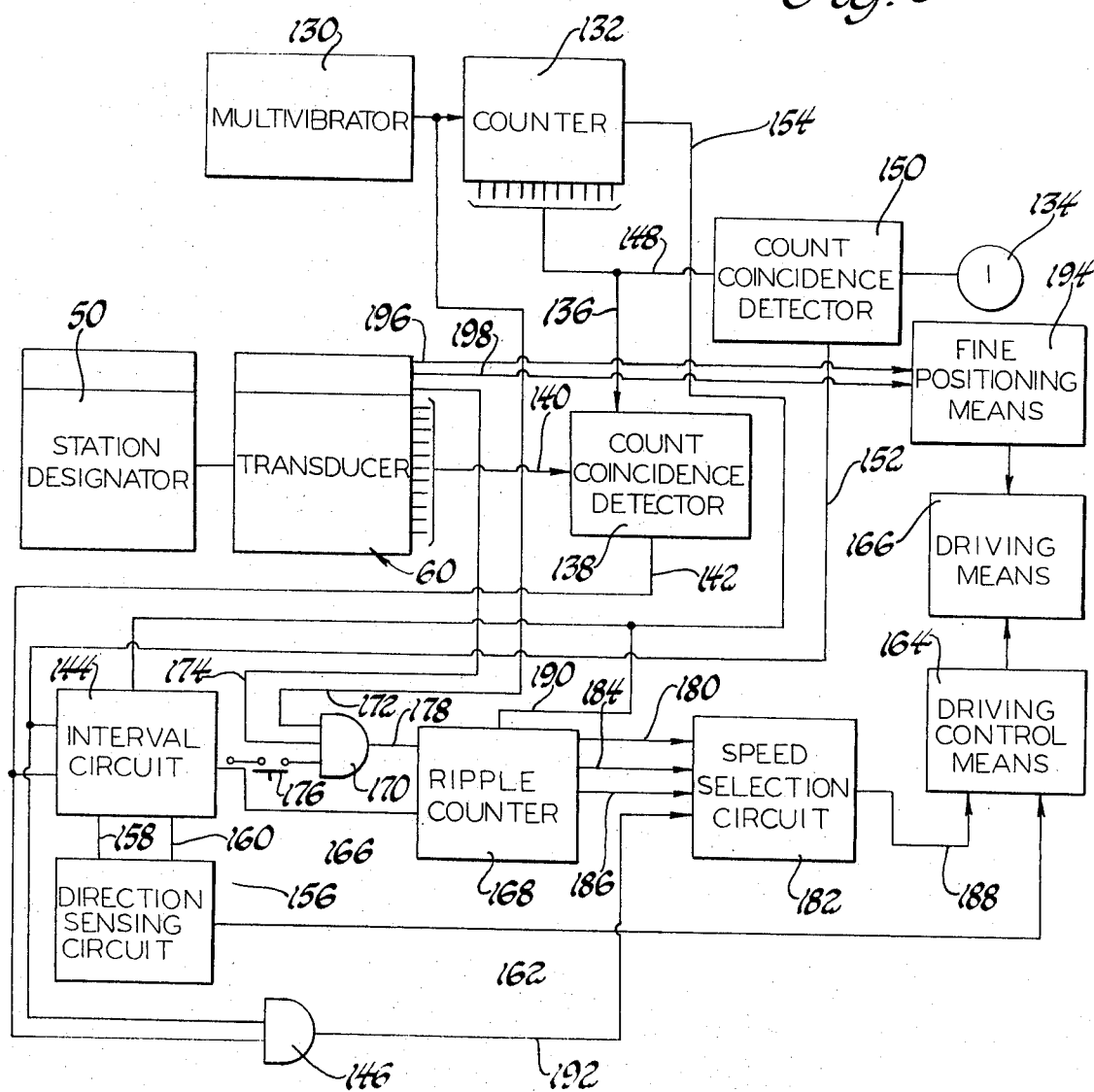
FIG. 7 is a block diagram of the electronic control system for the stacker vehicle.

Referring now to FIG. 7, the automatic control system embodying the address and null signal device and transducer just described utilizes a logic scheme which determines the distance and direction from the stacker vehicle to its destination station and controls the direction and speed of the motive power means in accordance therewith to position the vehicle accurately of the station. In general, the logic scheme comprises the generation of signals corresponding to the addresses of all station in a prescribed sequence and comparison thereof with a signal corresponding to the current location of the stacker vehicle and comparison also with a signal corresponding to the assigned destination of the stacker vehicle. When an address signal in the sequence of all address signals coincides with the signal corresponding to the current address of the vehicle, a location signal is generated and when it coincides with the signal corresponding to the assigned destination of the vehicle a destination signal is generated. The order in which the location signal and destination signal occur is indicative of the direction of travel required of the vehicle to move toward the destination station. The interval between the occurrence of the location signal and the destination signal is a measure of, or indicative of, the distance to be traveled from the current vehicle position to the destination station. The value of this interval may be used to generate a speed control signal whereby the driving means for the vehicle may be operated at high speed when the distance to be traveled is great with the speed being reduced in desired increments as the destination station is approached. When the location signal and the destination signal coincide in time the occurrence is indicative that the vehicle has arrived at the destination station and the speed control means for the vehicle motor may be switched to a final positioning mode of operation which operates to position the vehicle at the destination station in accurate alignment with the bins.

As shown in FIG. 7, the addresses of all stations accessible to the stacker vehicle are generated in sequence in binary form by a clock pulse generator or multivibrator 130 and a digital pulse counter 132 which receives the output of the multivibrator and registers the count thereof in continuous manner. A signal corresponding to the current location of the stacker vehicle is generated by the transdsucer 60 by its coaction with the station address signal device 50 which, for example, is the station in which the vehicle is parked or through which it is moving at the time. A signal in binary form corresponding to the address of the desired destination station for the vehicle is generated by an input device 134 which may suitably take the form of a punched card which stores the desired instruction information and a card reader, not shown, which produces the input signal in binary form. To obtain a vehicle location signal, the output of the counter 132 is supplied through line 136 to one input of a count coincidence detector 138 and the address output of the transducer 60 is supplied through a line 140 to the other input of the coincidence detector 138. When the station address represented by the output of the counter 132 coincides with the address represented by the output of the transducer 60 the coincidence detector 138 will produce an output pulse on line 142 which is connected to an input of an interval circuit 144 and one input of an AND gate 146. The occurrence of the vehicle location pulse in relation to the initial count of the multivibrator pulses is indicative of the number of stations by which the stacker vehicle is removed from the initial station. The output of the counter 132 is also supplied over a line 148 to one input of a second count coincidence detector 150 and the output of the input device 134 is supplied to the other input of the coincidence detector 150. The detector 150 will produce a destination signal pulse at its output when the counts on the respective inputs coincide and this pulse is applied over a line 152 to the other input of the interval circuit 144 and the other input of the AND gate 146. The occurrence of the destination signal pulse in relation to the initial count of the multivibrator pulses is indicative of the number of stations by which the destination station is removed from the initial station. When the multivibrator has generated a number of pulses corresponding to the total number of stations in the system the counter 132 is filled or reaches its upper preset limit and produces an end-of-count or reset pulse at its other output which is supplied over a line 154 to the reset input of the interval circuit 144.

In order to control the direction of the stacker vehicle a direction sensing circuit 156 is provided to detect the order of occurrence of the location signal pulse and the destination signal pulse which are applied thereto through the interval circuit 144 on lines 158 and 160, respectively. The direction sensing circuit 156 which suitably takes the form of a polarity switching circuit responds to the sequence of the input signals and produces an output of one polarity corresponding to a first sequence and an output of the opposite polarity for a second sequence. This output of the direction sensing circuit is applied over a line 162 to the driving control means 164 of the stacker vehicle.

For the purpose of controlling the speed of the stacker vehicle, the distance from the current address of the vehicle to the destination station is continuously determined. For this purpose, the interval circuit 144 which receives the location signal pulse on line 142 and the destination signal pulse on line 152 is adapted in response thereto to produce a control signal on a line 166 which is applied to one input of a ripple counter 168. The control signal applied to the input of the ripple counter from the interval circuit is effective to start and stop the counting action of the ripple counter 168 so that the period of counting is commensurate with the time period between the location signal pulse and the destination signal pulse. There is also provided an AND gate 170 which has one input connected through a line 172 to the output of the multivibrator 130. Another input of the AND gate 170 is connected through a line 174 to the strobe signal sensor 112 in the transducer 60. An additional input of the AND gate 170 is connected to a manual enable switch 176 which is closed to initiate automatic control of the stacker vehicle. The output of the AND gate is connected through a line 178 to the other input of the ripple counter 168. Thus, with the manual enable switch 176 closed and a strobe signal present on line 174 by reason of the vehicle being parked in or passing through a station, the AND gate 170 will apply the clock pulses from the multivibrator 130 to the other input of the ripple counter. The ripple counter 168 commences to accumulate the input pulse count upon the occurrence of either the location signal pulse or the destination signal pulse on line 166 and the counting action is terminated upon the occurrence of the remaining one of those pulses. Where the accumulated pulse count is relatively high and indicative of a large distance to the destination station, the ripple counter 168 produces a high speed output signal on a line 180 which is connected to one input of the speed selection circuit 182. When the accumulated count in the ripple counter 168 is of a relatively low value indicative of short distance to the destination station, the ripple counter produces a low speed output signal on a line 184 which is connected to another input of the speed selection circuit 182. Similarly, when the accumulated count is at an intermediate value the ripple counter produces an intermediate speed output signal on a line 186 which is connected to a third input of the speed selection circuit 182. The speed selection circuit 182 produces an output signal on a line 188 which is connected to one input of the driving control means 164 for the stacker vehicle. The driving control means is connected with the motive power means or driving means 166 which includes the propulsion motor 42 of the stacker vehicle and regulates the energization thereof to achieve the desired direction and speed control of the vehicle. The direction and speed control signals supplied to the driving control means 164 on lines 162 and 188, respectively, are produced during each sequence of address generation by the clock pulses from multivibrator 130 and the counting thereof in the counter 132. When a complete cycle of address generation is completed, the end-of-count signal on line 154 is applied to the interval circuit 144 to reset it for a new cycle and it is also applied over a line 190 to a reset input of the ripple counter 168 to reset the counter for a new cycle of operation. The address generation cycle by the multivibrator 130 and counter 132 is repeated continuously and for each such cycle a location signal pulse is generated by the coincidence detector 138 and a destination signal pulse is produced by the coincidence detector 150. Accordingly, a direction control signal is produced by the direction sensing circuit 150 and applied to the driving control means 164 and upon the occurrence of each strobe signal by the transducer 60 the ripple counter 168 produces a speed control signal which is applied through the speed selection circuit 182 to the driving control means 164. Thus, the vehicle control signals are updated at each way station between the initial station and the destination station.

When the stacker vehicle reaches the destination station the location signal pulse from the coincidence detector 138 and the destination signal pulse from the coincidence detector 150 will occur simultaneously at the respective inputs of the AND gate 146. The AND gate 146 is responsive to the coincidence of the inputs to produce an output signal on line 192 which is connected to a fourth input of the speed selection circuit 182 and is effective to transfer control of the driving means 166 from the driving control means 164 to a fine or null positioning control means 194. The null positioning control means 194 suitable takes the form of a control circuit including a servo which receives input signals from the null position sensors 114 and 116 of the transducer 60 over the lines 196 and 198, respectively. The null positioning means 194, which will be described in detail below, produces an output connected with the driving means 166 to control the energization thereof to position the stacker vehicle in a null position with reference to the null sensors and null vanes of the transducer and address signal device.

Null Positioning Control System

Figure 8:
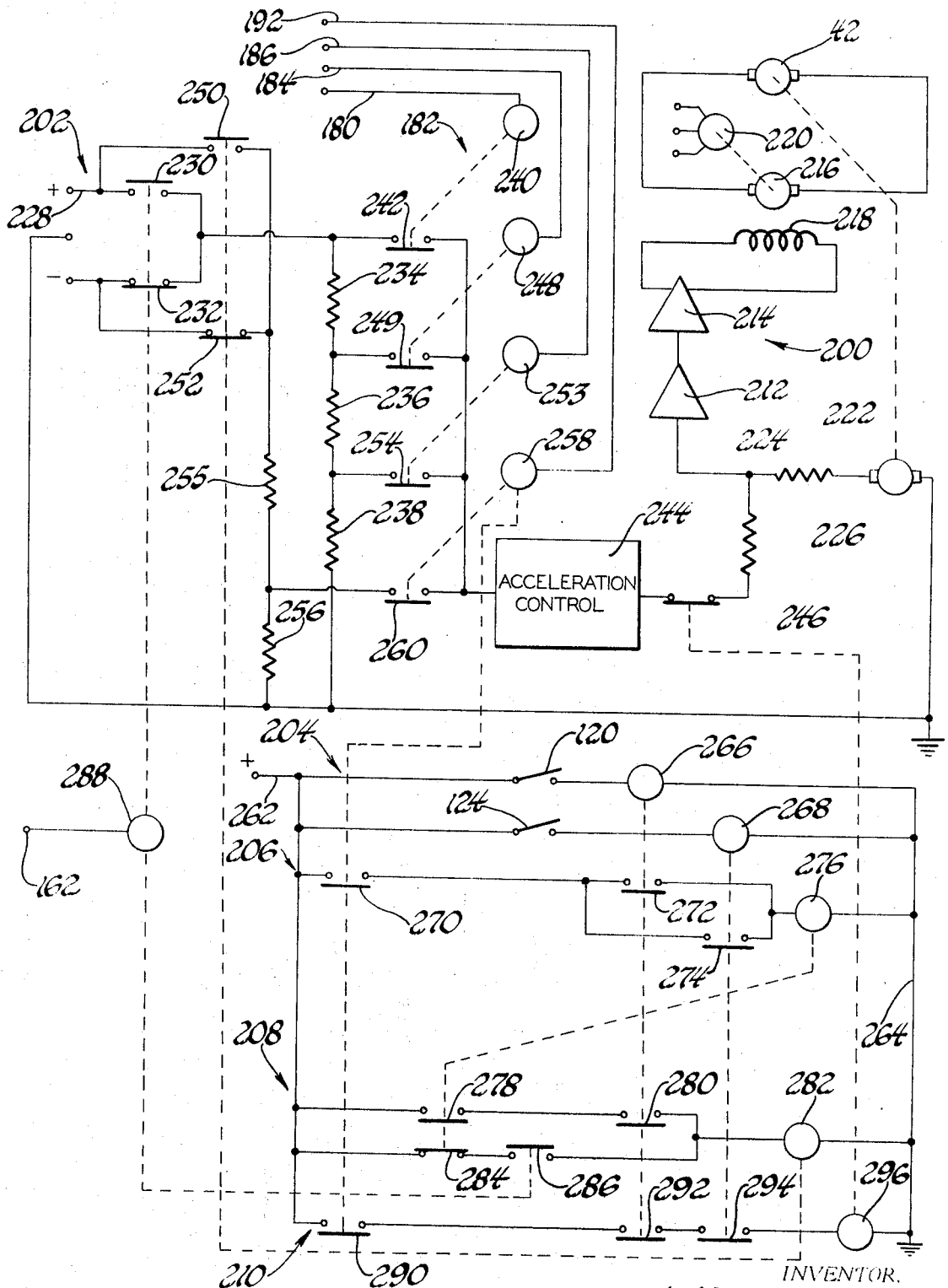
FIG. 8 is a schematic diagram of the speed selection circuit and the fine positioning control system of the invention.

Referring now to FIG. 8, the automatic positioning control system is shown for causing the movement of the stacker vehicle into accurate alignment with the destination station. In general, the control system includes a servo 200 for controlling the energization of the stacker vehicle drive motor 42 in the driving means 166 for moving the vehicle forward or backward in the aisle for alignment with the selected station. The control system further comprises a signal voltage source 202 including direction selection means adapted for connection to the input of the servo 200 through the speed selection circiut 182. Also, the control system comprises a sensor circuit 204, a transition control circuit 206, a reversing control circuit 208 and a null responsive circuit 210. The sensor circuit responds to the approach of the transducer 60 to the address signal device at the selected station and energizes the transition control circuit. This circuit, in turn, controls the reversing control circuit 208 to maintain energization of the servo 200 for the same direction of travel as the null position is approached. It also operates to reverse the direction of the servo in the nulling mode of operation if the stacker vehicle should overshoot the null position. The null responsive circuit 210 is controlled by the sensor circuit 204 and is effective, in response to the null position of the vehicle, to produce a null signal and de-energize the servo and the drive motor 42.

The control circuits, shown in FIG. 8, employ relays of the electromagnet type with movable switching contacts as is conventional for certain control circuits, depending upon the application and performance required. It will be appreciated that the control circuits may also be implemented with the use of solid state switching devices and in certain applications such implementation will be found to be preferable.

The servo 200 for controlling energization of the drive motor 42 is of the so-called "bang-bang" type and is adapted for on-off operation. The servo comprises a summing or servo amplifier 212 which receives the servo input signal and a power amplifier 214 which controls the energization of a DC generator 216 having a field winding 218 connected to the output of the power amplifier. The DC generator 216 is rotatably driven by a motor 220, suitably a polyphase induction motor energized from alternating voltage supply lines as indicated. The output terminals of the DC generator 216 are connected directly across the DC drive motor 42 which, as described previously, is connected through the power transmission unit 44 to the traction wheels of the stacker vehicle 28. A tachometer generator 222 is shaft coupled to the drive motor 42 to produce a rate feedback signal for stabilization of the servo loop. The tachometer generator 222 has one of its terminals connected to a point of reference potential or ground and the other terminal is connected through a summing resistor 224 to the input of the servo amplifier 212. The servo input signal is applied through a summing summing resistor 226 to the input of the servo amplifier 212 from the input signal voltage source 202 in a manner to be described presently. The servo 200 just described is of a well known type and responds to a DC input signal voltage to cause energization of the drive motor 42 for rotation in a direction and at a velocity corresponding to the polarity and magnitude of the signal voltage. The polarity and magnitude of the energizing current in the field winding 218 determines the polarity and magnitude of the output voltage of the DC generator 216 which, in turn, is applied across the motor 42 and produces a direction of rotation and speed corresponding thereto.

The signal voltage source 202 comprises a DC voltage source 228 having positive and negative supply terminals and a ground connection as indicated for producing servo input signals for driving the stacker vehicle between stations at selectable speeds. The voltage source 228 is connected with selectable polarity through switch contacts 230 or 232 across voltage divider resistors 234, 236 and 238. For high speed operation, as selected by the speed selection circuit 182, a control relay 240 energized by the line 180 (see FIG. 7) closes switch contacts 242 and a relatively high input signal voltage is applied to the input of the servo amplifier 212 through an acceleration control circuit 244, null switch contacts 246 and the summing resistor 226. For operation at an intermediate speed a control relay 248 is energized by the line 184 (see FIG. 7) and closes switch contacts 249. Thus, a signal voltage of intermediate value across the voltage divider resistors 236 and 238 is applied to the input of the servo amplifier 212 through the switch contacts 250, the acceleration control circuit 244, switch contacts 246 and summing resistor 226. Similarly, for low-speed operation a control relay 253 is energized by the line 186 (see FIG. 7) and closes switch contacts 254 to apply a signal voltage of low value from the voltage divider resistor 238 to the input of the servo amplifier 212 through the acceleration control circuit 244, switch contacts 246 and summing resistor 226.

The acceleration control circuit 244 referred to above operates to modify the input signal to the servo to control the acceleration of the motor 42. Such a control circuit is disclosed in copending patent application Ser. No. 704,741 filed Feb. 12, 1968 now U.S. Pat. No. 3,539,889 by Arthur R. Burch for "Means for Controlling Motor Driven Vehicles" and assigned to the same assignee as this application.

To provide for operation of the servo 200 in the nulling mode, the signal voltage source 202 is adapted to provide a nulling input signal of low magnitude and reversible polarity for very slow speed operation of the motor 42. The nulling signal voltage is supplied from the voltage source 228 selectively through switching contacts 250 or 252 across a pair of voltage divider resistors 255 and 256 when an address arrival relay 258 is energized by the line 192 (see FIG. 7). When the vehicle enters the destination station switch contacts 260 are closed by the address arrival relay 258 and the nulling signal voltage is thereupon supplied from the voltage divider resistor 256 through the switch contacts 260, acceleration control circuit 244, contacts 246 and the summing resistor 226.

The sensor circuit 204, the transition control circuit 206, reversing control circuit 208 and the null responsive circuit 210 are connected for energization between a supply voltage line 262 and a ground or return line 264. The sensor circuit 204 includes the reed switch 120 of the sensor 114 connected in series with a control relay 266 between the supply voltage line and the return line so that the relay is pulled in when the reed switch 120 is closed. Similarly, the circuit includes, in parallel, the reed switch 124 of the sensor 116 connected in series with a control relay 268 which is energized when the reed switch 124 is closed.

The transition control circuit 206 includes switch contacts 270 actuated by the address arrival relay 258. In series with contacts 270 are parallel connected switch contacts 272 and 274 which are actuated by relays 266 and 268, respectively. The circuit is completed through a transition control relay 276 which is energized when switch contacts 270 and either switch contacts 272 or 274 are closed.

The reversing control circuit 208 comprises a first branch extending through switch contacts 278 and 280 in series with a reversing control relay 282. A second branch extends through switch contacts 284 and 286 through the reversing control relay 282. Switch contacts 278 and 284 are actuated by the transition control relay 276 which is energized by closure of the contacts 270 by the address arrival relay 258 and the closure of either of the switch contacts 272 or 274 which results from closure of either of the reed switches 120 or 124. When the transition control relay 276 is de-energized the switch contacts 284 are closed and switch contacts 278 are open. The switch contacts 286 are actuated by a direction control relay 288 energized by a line 162 from the direction sensing circuit 156 (see FIG. 7). The direction control relay 288 also actuates the switch contacts 230 and 232 in the signal voltage source 202 for determining polarity of the signal voltage for the drive motor 42 in moving the vehicle between stations. When the direction control relay 288 is energized, switch contacts 230 are closed and switch contacts 232 are open thereby supplying a positive signal voltage for forward (rightward when facing the station) motion of the vehicle. Under these conditions switch contacts 286 are also closed. Thus, with switch contacts 284 and switch contacts 286 closed as the vehicle approaches the station in the forward or rightward direction the reversing control relay 282 is energized. This relay actuates the switch contacts 250 and 252 and, when energized, contacts 250 are closed and contacts 252 are open. In this condition the servo signal voltage for nulling operation across the voltage divider resistor 256 is positive polarity corresponding to forward or rightward direction of the vehicle.

The null sensing circuit 210 comprises switch contacts 290 which are actuated by the address arrival relay 258 to the closed position when the relay is energized. The circuit also includes switch contacts 292 and 294 which are normally open and actuated by the control relays 266 and 268 to the closed position upon energization thereof. The circuit is completed through a null control relay 296 which actuates the null contacts 246 and the input circuit of the servo amplifier 212. The null control relay 296 is energized upon closure of the contacts 294 by the address arrival relay 258 and upon closure of both contacts 292 and 294 by closure of the reed switches 120 and 124, respectively, which signify that the vehicle is located in the null position.

OPERATION

The operation of the inventive control system will be described with reference to a cycle of operation in which the input command signal calls for the stacker vehicle to move from the load station 24 to a station near the remote end of the aisle, i.e., in the forward or rightward direction to a null position at such station for deposit or withdrawal of a material unit at that station.

The destination station is selected by supplying the address thereof through the input device 134 and the system is energized for automatic control, as by the closure of the manual enable switch 176. Each of the stations along the access aisle 16 and accessible to the stacker vehicle 28 is provided with an address signal device 50, 52, 54, etc., as illustrated in FIGS. 4 and 5 in position so that the transducer 60 on the side of the stacker vehicle coacts therewith when the vehicle is either at rest in a station or is moving through a station. As previously described, each of the address signal devices is provided with vanes 70 at one or more of the predetermined positions $a$ through $h$ and $j$ in the address matrix area to represent the station address in coded form. Each signal device also includes the strobe vane 72 and the pair of null vanes 74 and 76.

The continuous generation of station addresses in sequence and repeated cycles thereof by the clock pulses from multivibrator 130 and the count thereof in counter 132 commences upon energization of the system. Assuming that the stacker vehicle is initially at rest in a given station, the transducer 60 coacting with the address signal device, such as device 50, supplies the address signal to the coincidence detector 138 and when the address correspondingg thereto is reached by the counter 132 the coincidence detector 138 produces a location signal pulse which is applied on line 142 to the interval circuit 144 and to the AND gate 146. Similarly, when the clock pulses from the multivibrator 130 and the counter 132 reach the address corresponding to the destination address supplied by the input 134, the coincidence detector 150 produces a destination signal pulse which is applied to the interval circuit 144 and to the AND gate 146. Assuming that the vehicle was at an initial station near the load station 24 and the assigned destination station is at the remote end of the aisle, then the location signal pulse will occur before the destination signal pulse. Consequently, the direction sensing circuit 156 will produce an output signal on line 162 and relay 288 will be energized thus closing switch contacts 230 and applying a positive voltage across voltage divider resistors 234, 236, and 238 corresponding to forward or rightward motion, i.e., in a direction away from the load station 24. Since the initial station and the destination station are at a relatively great distance from each other, the interval between the location signal pulse and the destination signal pulse will be relatively great. While the vehicle is still in the initial station the transducer 60, by reason of coaction of the strobe sensor 112 with the strobe vane 72, will produce a strobe signal which is applied to the AND gate 170. The clock pulses from the multivibrator 130 will thus be supplied through the AND gate 170 to the input of the ripple counter 168 over the relatively long interval between the location signal pulse and the destination signal pulse. Thus, a high speed signal will be developed by the ripple counter on line 180 and the high speed relay 240 will be energized to close contacts 242. Thus, the driving motor 42 will be energized to drive the stacker vehicle at high speed. When the address generation cycle is completed by the multivibrator 130 and counter 132 an end-of-count signal will be applied through lines 154 and 190 to the reset input of the interval circuit 144 and the ripple counter 168, respectively. When the next station is reached with the stacker vehicle moving therethrough at the high speed previously selected, the transducer 60 will coact with the station address signal device and produce an input to the coincidence detector 138 corresponding to the address of the station. In the same manner as just described the coincidence detector 138 will produce a location signal pulse and the coincidence detector 150 will produce a destination signal pulse. The direction sensing circuit will respond to the sequence of the location and destination signal pulses as before and the interval circuit 144 will, together with the strobe signal from the transducer 60, cause the ripple counter 168 to produce a speed signal in accordance with the pulse count in the interval between the location signal pulse and the destination signal pulse. The high speed signal from the ripple counter 168 will persist while the vehicle is at a great distance from the destination station. However, as the vehicle continues to move through way stations toward the destination station and the distance is reduced to a predetermined amount the system will continue to operate in the manner described except that the number of pulses applied to the ripple counter in the interval between the location signal pulse and the destination signal pulse will be reduced so that the ripple counter produces an intermediate speed signal on line 184 and the relay 248 is energized and relay 240 is de-energized. Closure of contacts 249 applies an input voltage to the servo amplifier 212 which causes energization of the motor 42 at an intermediate speed of operation. As the vehicle approaches the destination station within a predetermined close range, the interval between the location signal pulse generated in response to the transducer input to the coincidence detector 138 and the destination signal pulse produced by the detector 150 is relatively small and the pulse count accumulated by the ripple counter 168 is relatively small. Accordingly, the ripple counter produces a low-speed output signal on line 186 and the relay 253 is energized and the relay 248 is de-energized. Accordingly, contacts 254 are closed and an input voltage is applied to the servo amplifier 212 which is effective to reduce the energization of the motor 42 for low speed operation of the vehicle. As the vehicle continues to move into the destination station the location signal pulse from the coincidence detector 138 and the destination signal pulse from the coincidence detector 150 occur simultaneously and the AND gate 146 produces an output signal on line 192 and the address arrival relay 258 is energized and the relay 253 is de-energized. Accordingly, the control of the motor 42 is transferred from the driving control means 164 to the fine positioning means 194.

With the stacker vehicle at the destination station, it remains to be positioned in accurate alignment with the adjacent bin. With the stacker vehicle approaching the station in the forward or rightward direction the transducer 60 will be approaching the signal device as indicated in FIG. 6 in which the transducer is viewed from a position behind the address signal device, i.e., looking from the bin toward the aisle. When the vehicle moved into the station in the forward direction, as indicated by the arrows in FIG. 6, the sensor 114 first passed over the null vane 74 before the strobe sensor 112 reached the strobe vane 72. Then after the occurrence of the strobe signal and readout of the address which resulted in energization of the address arrival relay 258, the null sensor 114 was positioned opposite the null vane 76 in the nulling mode of operation. Accordingly, the length of the strobe vane 72 determines the region of the nulling mode of operation, and closure of the reed switch 120 and energization of the control relay 266 causes the closure of contacts 272 in the transition control circuit 206. The control relay 266 also causes the closure of contacts 280 and 292 in the reversing control circuit 208 and the null responsive circuit 210, respectively. With the closure of contacts 270 and contacts 272 in the transition control circuit 206, the transition relay 276 is energized. This causes closure of the contacts 278 and the opening of contacts 284 in the reversing control circuit 208. Accordingly, the reversing relay 282 is now energized through the contacts 278 and 280 instead of the contacts 284 and 286. Accordingly, the reversing relay 282 maintains the switch contacts 250 closed and switch contacts 252 open so that an input signal voltage of positive polarity continues to be applied to the servo for movement in the forward or rightward direction. As the vehicle continues to move in the forward or rightward direction, the sensor 116 is disposed opposite the null vane 74 and the reed switch 124 is closed. This causes control relay 268 to be energized which in turn closes switch contacts 274 in the transition control circuit 206 and closes switch contacts 294 in the null responsive circuit 210. When this occurs, the vehicle is at the desired reference or null position and the simultaneous closure of contacts 290, 292 and 294 in the null responsive circuit 210 causes energization of the null relay 296 which actuates the null contacts 246 to the open position. This removes the input signal from the servo amplifier 212 and the motor 42 comes to a stop. With the stacker at rest in the null position it is adapted for withdrawal or deposit of material units at the assigned bin and then it is ready for a new cycle of operation at a different destination station.

However, if in approaching the null position as just described the stacker vehicle for some reason should overshoot the null position, the sensor 114 would effectively pass beyond the end of the null vane 76 and the reed switch 120 would open. Accordingly, control relay 266 would be deenergized and switch contacts 272, 280 and 292 would be opened. The opening of switch contacts 292 in the null responsive circuit 210 would de-energize the null relay 296 and allow the null contacts to reclose. The opening of switch contacts 280 in the reversing control circuit 208 would at the same time de-energize the reversing relay 282 which will cause a reversal of polarity of the servo input signal voltage by opening switch contacts 250 and closing switch contacts 252. The closure of switch contacts 252 applies a signal voltage of negative polarity across the voltage divider resistor 256 and thence to the input of the servo amplifier 212 causing the motor 42 to be energized in a reverse direction to move the stacker vehicle in the backward or leftward direction. When the sensor 114 is thus returned to the null position relative to null vane 76 the reed switch 120 is reclosed and the control relay 266 is re-energized. This causes closure of the switch contacts 272, 280 and 292. Thus, the null responsive circuit is completed through the switch contacts 290, 292 and 294 and the null responsive relay 296 is again energized to open the null contacts 246 and remove the input signal from the servo amplifier 212. This stops the motor 42 and brings the stacker vehicle to a stop in the null position in readiness for the next phase of operation.

The operation of the automatic position control system with the stacker vehicle approaching the destination station in a backward or leftward direction is analagous to that just described with reference to the opposite approach. Similarly, overshoot of the vehicle in either the forward or rearward direction of motion on either direction of approach causes automatic reversal of the energization of the drive motor in a manner analagous to that described above.

Although the description of this invention has been given with respect to a particular embodiment thereof it is not to be construed in a limiting sense. Many variations and modifications will now occur to those skilled in the art. For a definition of the invention reference is made to the appended claims.

The embodiments of the invention in which an exclusive property or privilege is claimed are defined as follows:

1. A vehicle control system adapted to control the movement of a vehicle into a predetermined position relative to a selected station comprising: motive power means on the vehicle for moving it forward and backward on a path extending past the station, first control means responsive to a destination station command signal for causing energization of the motive power means to move the vehicle in the direction of the selected station at a controlled speed, transition control means responsive to the arrival of the vehicle at the selected station for transferring control of the motive power means from the first control means to a second control means, said second control means including a signal device at the selected station and defining first and second limit positions in the forward and backward directions, sensing means including first and second spaced sensors on the vehicle and adapted to coact with the signal device to produced a binary signal when aligned with either the first or second limit positions of said signal device, said transition control means being connected with said sensing means and responsive to the occurrence of a binary signal from one of said sensors to cause energization of the motive power means for continued movement in the same direction, and a null responsive means connected with said sensing means and responsive to the simultaneous occurrence of binary signals from both of said sensors to interrupt the power to said motive power means and stop said vehicle.

2. The invention as defined in claim 1 wherein said motive power means includes a servo amplifier and a motor energized in accordance with the output of the amplifier, said servo amplifier being adapted to be operated in an on-off mode in response to a binary input signal, said second control means connected weith the servo amplifier and being adapted to produce a first binary signal when only one sensor is aligned with either the first or second limit positions and being adapted to produce a second binary signal when both sensors are aligned with said first and second limit positions.

3. The invention as defined in claim 2 and further including reversing control means connected with said sensing means and with said transition control means and being responsive to the second occurrence of a binary signal from said one of said sensors to reverse the energization of the motive power means to move the vehicle in the other direction toward the predetermined position.

4. The invention as defined in claim 1 wherein each sensor is adapted to produce a first and second signal when disposed outside and inside of said first and second limit positions respectively, the transition control means being adapted to energize the motive power means in one direction in response to a second signal from one sensor and in the other direction in response to a second signal from the other sensor, said null responsive means being responsive to the simultaneous occurrence of said first signals from both sensors to interrupt the power and stop the vehicle.

5. The invention as defined in claim 1 wherein said motive power means includes a servo amplifier and a motor energized in accordance with the output of the amplifier, said servo amplifier being adapted to be operated in an on-off mode in response to a binary input signal, said null responsive means including a null responsive circuit adapted to produce a first binary signal when a sensor is within the first and second limit positions and being adapted to produce a second binary signal when the first and second sensors are aligned with said first and second limit positions respectively, said null responsive circuit being connected with said servo amplifier.

6. The invention as defined in claim 1 wherein said transition control means includes a strobe signal element in said signal device and a strobe sensor in said sensing means adapted to enable the transition control means so long as the strobe sensor is disposed adjacent the strobe signal element and thereby establish the region of control by said second control means.

7. The invention as defined in claim 6 and further including station address means at said destination station, said sensing means being adapted to read said address means when the strobe sensor is disposed adjacent the strobe signal element.

8. The invention as defined in claim 7 wherein said region of control by the second control means is determined by the length of the strobe signal element in said direction of the selected station.

9. The invention as defined in claim 8 wherein the strobe sensor comprises a magnetic field producing means and a magnetic field responsive means with an air gap therebetween and said strobe signal element comprises a plate of magnetic material adapted to extend into said air gap when disposed adjacent said strobe sensor.

10. A vehicle control system adapted to control the movement of a vehicle into a predetermined position relative to a selected station comprising: motive power means on the vehicle for moving it forward and backward on a path extending past the station, said motive power means including a servo amplifier and a motor energized in accordance with the output of the amplifier, said servo amplifier being adapted to be operated in an on-off mode in response to a binary input signal, first control means responsive to a destination station command signal and adapted to produce a binary input signal of one value to cause energization of the motive power means to move the vehicle in the direction of the selected station at a first speed, transition control means responsive to the arrival of the vehicle at the selected station for transferring control of the motive power means from the first control means to a second control means, the said second control means including a signal device at the selected station and defining first and second limit positions in the forward and backward directions, sensing means including first and second spaced sensors on the vehicle and adapted to coact with the signal device to produce a signal when aligned with either the first or second limit positions of said signal device, said transition control means being connected with said sensing means and responsive to the occurrence of a signal from one of said sensors to produce a binary input signal of a second value to cause energization of the motive power means for continued movement in the same direction at a second speed, and a null responsive means connected with said sensing means and responsive to the simultaneous occurrence of signals from both of said sensors to interrupt the power to said motive power means and stop said vehicle.

11. The invention as defined in claim 6 wherein said null responsive circuit in said second control means includes means to produce a first binary signal when a sensor is within the first and second limit positions and being adapted to produce a second binary signal when the first and second sensors are aligned with said first and second limit positions respectively, said null responsive circuit being connected with said servo amplifier.

12. The invention as defined in claim 6 wherein each sensor is adapted to produce a first and second signal when disposed outside and inside of said first and second limit positions respectively, and further including reversing control means connected with said sensors, the reversing control means being adapted to energize the motive power means in one direction in response to a second signal from one sensor and in the other direction in response to a second signal from the other sensor, said null responsive means being responsive to the simultaneous occurrence of said first signals from both sensors to interrupt the power and stop the vehicle.

* * * * *